(12) United States Patent
Chien

(10) Patent No.: US 10,049,221 B2
(45) Date of Patent: Aug. 14, 2018

(54) MANAGEMENT OF APPLICATION ACCESS

(71) Applicant: AT&T Mobility II LLC, Atlanta, GA (US)

(72) Inventor: Ginger Li Chien, Bellevue, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 15/151,694

(22) Filed: May 11, 2016

(65) Prior Publication Data

US 2016/0253507 A1 Sep. 1, 2016

Related U.S. Application Data

(63) Continuation of application No. 14/467,290, filed on Aug. 25, 2014, now Pat. No. 9,342,708, which is a
(Continued)

(51) Int. Cl.
*G06F 21/60* (2013.01)
*H04W 12/08* (2009.01)
(Continued)

(52) U.S. Cl.
CPC .......... *G06F 21/604* (2013.01); *G06F 3/0482* (2013.01); *G06F 3/04842* (2013.01); *G06F 21/629* (2013.01); *H04W 12/08* (2013.01)

(58) Field of Classification Search
CPC .. G06F 21/604; G06F 3/04842; G06F 3/0482; G06F 21/629; H04W 12/08
See application file for complete search history.

(56) References Cited

U.S. PATENT DOCUMENTS

| 7,502,610 B2 | 3/2009 | Maher |
| 7,921,187 B2 | 4/2011 | Lunati et al. |

(Continued)

OTHER PUBLICATIONS

Tariq, H., "AppSlider Allows You Place Two Shortcut Apps Icon on LockScreen," [http://www.freakgeeks.com/appslider-allows-you-place-two-shortcut-apps-icon-on-lockscreen/], retrieved on May 10, 2012.

(Continued)

*Primary Examiner* — Beemnet Dada
(74) *Attorney, Agent, or Firm* — Hartman & Citrin LLC

(57) ABSTRACT

Concepts and technologies are disclosed herein for management of application access. A security management application can be configured to set access controls and/or other security settings relating to application programs. Additionally, or alternatively, particular functions and/or functionality associated with application programs may be individually configured. Settings reflecting the access controls and/or other security settings can be stored and can be applied at the user device. The security management application also can be configured to determine if security settings and/or access controls are to be overridden. Data can be collected from various sensors and/or other sources to use in determining if particular application programs and/or application program functionality is to be allowed. Thus, normally disallowed activities can be allowed in emergency conditions, when in a business location associated with a particular device, and/or at other times and/or under other circumstances.

20 Claims, 9 Drawing Sheets

Related U.S. Application Data continuation of application No. 13/557,781, filed on Jul. 25, 2012, now Pat. No. 8,819,850.

(51) Int. Cl.
*G06F 21/62* (2013.01)
*G06F 3/0482* (2013.01)
*G06F 3/0484* (2013.01)

(56) References Cited

U.S. PATENT DOCUMENTS

| | | | |
|---|---|---|---|
| 8,811,948 B2 * | 8/2014 | Bandyopadhyay ... | G06F 1/1643 345/173 |
| 8,819,850 B2 | 8/2014 | Chien | |
| 2004/0002326 A1 | 1/2004 | Maher | |
| 2004/0015668 A1 | 1/2004 | McBrearty et al. | |
| 2004/0158738 A1 | 8/2004 | Tanaka | |
| 2004/0243823 A1 | 12/2004 | Moyer et al. | |
| 2005/0172265 A1 | 8/2005 | Brigham et al. | |
| 2006/0153075 A1 | 7/2006 | Whitehill et al. | |
| 2007/0118558 A1 | 5/2007 | Kahandaliyanage | |
| 2008/0244685 A1 | 10/2008 | Andersson et al. | |
| 2009/0144456 A1 | 6/2009 | Gelf et al. | |
| 2012/0084734 A1 * | 4/2012 | Wilairat ............ | G06F 21/36 715/863 |
| 2012/0188249 A1 | 7/2012 | Kretz et al. | |
| 2012/0191758 A1 | 7/2012 | Lewis et al. | |
| 2012/0304262 A1 | 11/2012 | Cucco et al. | |
| 2013/0052992 A1 | 2/2013 | Lee et al. | |
| 2013/0055378 A1 | 2/2013 | Chang et al. | |
| 2013/0347099 A1 | 12/2013 | Smith | |

OTHER PUBLICATIONS

"AT&T HTC Status—Customizing Lockscreen Shortcuts" [http://att.deviceanywhere.com/HTCStatus/tutorials/13185], retrieved on May 10, 2012.

Heath, A., "How to Access Notification Center from Your Lock Screen [Jailbreak]," [http://www.cultofmac.com/146327/how-to-access-notification-center-from-the-lock-screen-jailbreak/], retrieved on Feb. 14, 2012.

"LockLauncher: Launch Apps from your iPhone Lockscreen," [http://www.callingallgeeks.org/33695/locklauncher-launch-apps-from-your-iphone-lockscreen/], retrieved on May 10, 2012.

"LockMenu Adds Your Frequently Used Apps to the Android Lock Screen," [http://www.vikitech.com/3897/lockmenu-adds-favorite-apps-to-android-lock-screen] Printed May 10, 2012.

HuSmith, Inc., "LockMenu," [https://play.google.com/store/apps/details?id=com.husmithinc.android.lockmenu &feature=search_result#?t=W251bGwsMSwxLDEslmNvbS5odX NtaXRoaW5jLmFuZHJvaWQubG9ja21lbnUiXQ], retrieved on May 10, 2012.

"Lock Screen Apps Sample," [http://code.msdn.microsoft.com/windowsapps/Lock-screen-apps-sample-9843dc3a], retrieved on May 10, 2012.

YouTube, "How to Open Apps from Lockscreen on iPhone, iPod Touch & iPad—Multislide," [http://www.youtube.com/watch?v=PdVVgekif5k], Jun. 18, 2011, retrieved on May 10, 2012.

YouTube, "HTC Sensation—Access Info and Apps Right from the Lock Screen," [http://www.youtube.com/watch? v=AQ-JAlb70Vs], Jun. 23, 2011, retrieved on May 10, 2012.

YouTube, "[How to] Launch Apps from Lockscreen on iPhone and iPod Touch," [http://www.youtube.com/watch?v=WbpeefXFy_8], Jul. 25, 2011, retrieved on May 10, 2012.

YouTube, "Access Apps from Lockscreen—LockDock—FREE!," [http://www.youtube.com/watch?v=q5HjWArDcIA], Apr. 22, 2010, retrieved on May 10, 2012.

U.S. Office Action dated Nov. 1, 2013 in U.S. Appl. No. 13/557,781.
U.S. Notice of Allowance dated Apr. 10, 2014 in U.S. Appl. No. 13/557,781.
U.S. Office Action dated Mar. 19, 2015 in U.S. Appl. No. 14/467,290.
U.S. Office Action dated Aug. 12, 2015 in U.S. Appl. No. 14/467,290.
U.S. Notice of Allowance dated Jan. 19, 2016 in U.S. Appl. No. 14/467,290.

* cited by examiner

MANAGEMENT OF APPLICATION ACCESS

CROSS-REFERENCE TO RELATED APPLICATIONS

This application is a continuation of and claims priority to U.S. patent application Ser. No. 14/467,290, filed Aug. 25, 2014, entitled "Management of Application Access," now U.S. Pat. No. 9,342,708, which is incorporated herein by reference in its entirety; and which is a continuation of and claims priority to U.S. patent application Ser. No. 13/557,781, filed Jul. 25, 2012, entitled "Management of Application Access," now U.S. Pat. No. 8,819,850, which is incorporated herein by reference in its entirety.

BACKGROUND

This application relates generally to applications and access to application functionality. More specifically, the disclosure provided herein relates to a management of application access.

Over the past several years, the use of mobile computing devices supporting various types of applications has proliferated rapidly. Many consumers have at least one smartphone or tablet computer that can execute various types of applications and/or other types of functionality. Because these applications and/or functions can access data networks and/or allow users to interact with sensitive data, these and other types of computing devices often use and/or apply a security policy to prevent unauthorized access.

In some cases, a lock screen is presented when a device is powered on, brought out of a sleep or hibernation mode, and/or at other times. To gain access to the applications installed at the device, a user or other entity must enter a passcode or password, a username, and/or otherwise successfully authenticate with the device. Thus, a computing device can offer authorized users high levels of functionality and/or allow interactions with sensitive information and/or applications, without subjecting personal information to theft and/or other types of misappropriation that otherwise may be common with portable devices such as smartphones.

SUMMARY

The present disclosure is directed to management of application access. According to concepts and technologies disclosed herein, frequent and/or convenient access can be given to applications and/or particular functions of applications. According to various embodiments of the concepts and technologies disclosed herein, application programs and/or functionality of application programs of a user device can be accessed without unlocking the user device and/or otherwise authenticating with the user device. Various embodiments of the concepts and technologies disclosed herein also can be used to enable users to configure what application programs and/or specific functionality of the application programs are or are not to be allowed without unlocking a user device.

According to various embodiments, the user device can execute a security management application for configuring one or more application programs installed at the user device to set access controls and/or other security settings relating to the application programs. In some embodiments, an application program can include multiple functions, and users or other authorized entities can be allowed to configure the application for "tiered access." As used herein, the term "tiered access" and/or variations thereof, can be used to refer to application programs and/or other software having multiple functions that can be separately configured to allow or disallow access to one or more of the functions when the user device is in a locked state or other secure state. Settings reflecting the access controls and/or other security settings can be stored and can be applied at the user device.

In some embodiments, the user device can be configured to determine if security settings and/or access controls are to be overridden when the user device is powered on, brought out of sleep or hibernation mode, and/or otherwise interacted with when the user device is locked. In particular, the user device can collect data from various sensors and/or other sources to determine if particular application programs and/or application program functionality is to be allowed. Thus, users who cannot authenticate with the user device may be allowed to access certain functionality in emergency conditions, when in a business location associated with the user device, and/or at other times and/or under other circumstances.

According to one aspect of the concepts and technologies disclosed herein, a method is disclosed. The method can include launching a security management application. The security management application can be launched, for example, at a computing device. The method also can include selecting an application program installed at the computing device and setting an access control associated with the application program. The access control can define whether or not access to the application program is to be allowed when the computing device is in a secured state. The method also can include storing a setting defining the access control associated with the application program.

In some embodiments, the method also can include determining if tiered access is to be configured for the application program, wherein the application program can be executed to provide a number of functions. Setting the access control can include selecting a function of the number of functions, and assigning a function access control for the function. Selecting the function also can include presenting a list including data indicating at least one of the number of functions and a user interface control for assigning the function access control, and receiving input corresponding to the function access control assigned to the function via the user interface. In some embodiments, setting the access control can include presenting a list including data indicating the application program and a user interface control for assigning the access control to the application program, and receiving input corresponding to the access control assigned to the application program via the user interface.

In some embodiments, the method further can include exiting the security management application, again launching the security management application, collecting data at the user device, and determining if the access control is to be overridden based, at least partially, upon the data collected. Collecting the data can include collecting sensor data indicating an emergency condition at the user device. In some embodiments, in response to determining that the access control is to be overridden based upon the emergency condition, the method can include overriding the access control to allow access to the application program. Collecting the data also can include determining a geographic location of the user device. In some embodiments, in response to determining that the access control is to be overridden based upon the geographic location, the method can further include overriding the access control to allow access to the application program, wherein the geographic location can correspond to a business location associated with an owner of the user device.

According to another aspect of the concepts and technologies disclosed herein, a computer storage medium is disclosed. The computer storage medium can have computer-executable instructions stored thereon that, when executed by a computer, cause the computer to launch a security management application at the computer, select an application program installed at the computer, and set an access control associated with the application program. The access control can define whether or not access to the application program is to be allowed when the computing device is in a secured state. The secured state can include a locked state. The computer-executable instructions can further include instructions that, when executed by the computer, cause the computer to store a setting defining the access control associated with the application program.

In some embodiments, the computer storage medium can further include computer-executable instructions that, when executed by the computer, cause the computer to determine if tiered access is to be configured for the application program, wherein the application program is executable to provide a number of functions, select a function of the number of functions, and assign a function access control for the function. In some embodiments, selecting the function can include presenting a list including data indicating at least one of the number of functions and a user interface control for assigning the function access control, and receiving input corresponding to the function access control assigned to the function via the user interface. In some embodiments, setting the access control can include presenting a list including data indicating the application program and a user interface control for assigning the access control to the application program, and receiving input corresponding to the access control assigned to the application program via the user interface. In some embodiments, the computer storage medium can further include computer-executable instructions that, when executed by the computer, cause the computer to exit the security management application, launch the security management application, collect data at the user device, and determine if the access control is to be overridden based, at least partially, upon the data collected.

According to yet another aspect, a mobile computing device including a processor configured to execute computer-executable instructions stored thereon for providing a security management application, wherein the processor is configured, via execution of the security management application, to launch the security management application at the mobile computing device and select an application program installed at the mobile computing device. The application program can be selected from a number of application programs. The processor can be further configured to determine if tiered access is to be configured for the application program. In response to determining that tiered access is not to be configured, the processor can set an access control associated with the application program, the access control defining whether access to the application program is to be allowed when the computing device is in a secured state, and store a setting defining the access control associated with the application program. In response to determining that the tiered access is to be configured, the processor can select a function of the number of functions, assign a function access control for the function, and store a setting defining the function access control associated with the application program.

In some embodiments, the mobile computing device can include a smartphone. In some embodiments, the secured state can include a lock screen. The processor can be further configured to present a list including data indicating at least one of the number of functions and a user interface control for assigning the function access control, and receive input corresponding to the function access control assigned to the function via the user interface. The processor also can be configured to present a list including data indicating the application program and a user interface control for assigning the access control to the application program, and receive input corresponding to the access control assigned to the application program via the user interface. In some embodiments, the processor can be further configured to exit the security management application, launch the security management application, collect data at the mobile computing device using a sensor associated with the mobile computing device, and determine if the access control is to be overridden based, at least partially, upon the data collected.

In some embodiments, the security management application described herein can execute locally on a user device such as a smartphone, tablet computer, or the like, and can allow the user to make configuration changes. In some other embodiments, the security management application can be configured to execute remotely (with respect to the user device). For example, the security management application can be executed at an enterprise management console or other location, and can be configured to allow users to make changes remotely. Thus, in some embodiments, the security management application can execute locally or remotely, and can be configured to monitor states and/or other aspects of a user device from afar. Additionally, or alternatively, the security management application (whether locally and/or remotely executed), can be configured to adjust states, settings, configurations, and/or other aspects of user device locally and/or remotely. Thus, in some embodiments, the security management application can be configured to expose and/or access an application programming interface ("API") available to applications executing at or remotely from the user device.

In some embodiments, applications executing on a device configured to use the functionality described herein with respect to the security management application can be configured to self-determine whether or not user access to application functionality is or is not to be allowed through a fully authenticated (e.g., unlocked) state or through a secured or locked state. Thus, application programs can be configured to execute logic that can be built-in to the application programs and/or configured via a managed rule set to determine how and/or whether to show certain functionality to the user as a function of that access state.

In some contemplated embodiments, a security layer can be provided for a user device. The security layer can be configured to govern usable functionality. In some embodiments, such an approach may be impractical due to a possible inability to differentiate subtleties of functionality within an application program. In other embodiments, however, the security layer governance approach may be useful. In particular, if a rule set involved a global rule such as "no use of screen display at all" for access in a locked state, then certain security limitations may be imposed against all applications, for example. Thus, a user or other authorized entity may impose security that would, for example, only allow applications with audio to be usable in a locked state. There are many conceivable rules that may be imposed on application programs and/or on a device at a security layer level. These rules can range from subtle rules that could only be implemented within application-specific logic such as "show first names only when unauthenticated user views contact data" to potentially useful global rules that could be governed at a system level such as "disable ability to use phone and network for unauthenticated users." It should be understood that these embodiments are illustrative, and should not be construed as being limiting in any way.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure.

DETAILED DESCRIPTION

The following detailed description is directed to management of application access. According to concepts and technologies disclosed herein, application programs and/or functionality of application programs of a user device can be accessed without unlocking the user device and/or otherwise authenticating with the user device. Various embodiments of the concepts and technologies disclosed herein also can be used to enable users to configure what application programs and/or specific functionality of the application programs are or are not to be allowed without unlocking a user device. The user device can execute a security management application for configuring one or more application programs installed at the user device to set access controls and/or other security settings relating to the application programs. Additionally, or alternatively, particular functions and/or functionality associated with application programs may be individually configured. Settings reflecting the access controls and/or other security settings can be stored and can be applied at the user device.

The user device also can be configured to determine if security settings and/or access controls are to be overridden when the user device is powered on, brought out of sleep or hibernation mode, and/or otherwise interacted with when the user device is locked. In particular, the user device can collect data from various sensors and/or other sources to determine if particular application programs and/or application program functionality is to be allowed. Thus, users who do not authenticate with the user device may be allowed to access certain functionality in emergency conditions, when in a business location associated with the user device, and/or at other times and/or under other circumstances.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
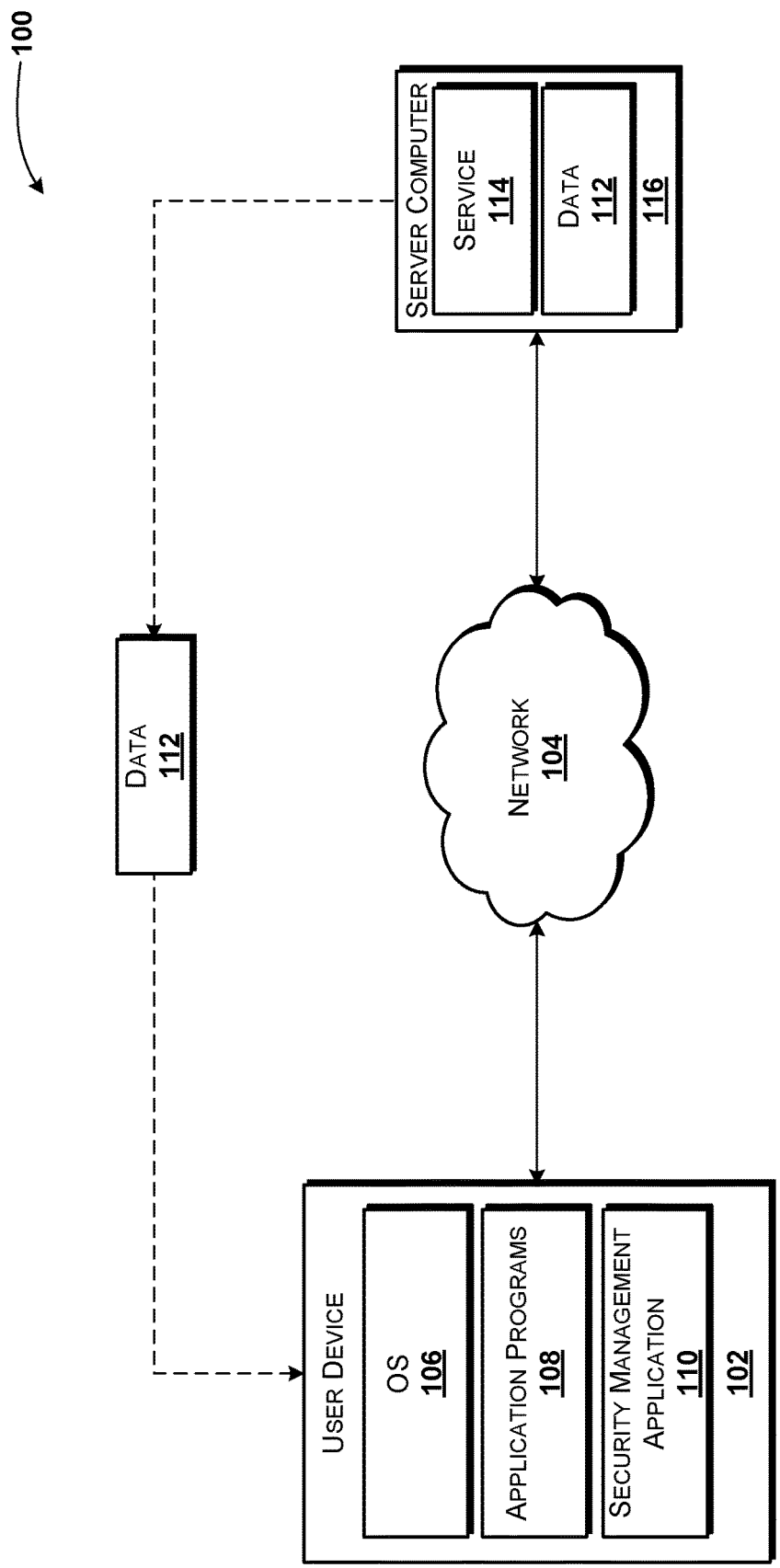
FIG. 1 is a system diagram illustrating an illustrative operating environment for the various embodiments disclosed herein.

Referring now to FIG. 1, aspects of an operating environment 100 for various embodiments of the concepts and technologies disclosed herein for management of application access will be described, according to an illustrative embodiment. The operating environment 100 shown in FIG. 1 includes a user device 102 operating in communication with and/or as part of a communications network ("network") 104.

According to various embodiments, the functionality of the user device 102 may be provided by one or more mobile telephones, laptop computers, tablet computers, slate computers, navigation devices, or the like. In some other embodiments, the functionality of the user device 102 can be provided by one or more desktop computers, server computers, set-top boxes, embedded computer systems, other computing systems, and the like. It should be understood that the functionality of the user device 102 described herein can be provided by a single device executing a local or remote application, or by two or more devices. For purposes of describing the concepts and technologies disclosed herein, the user device 102 is described herein as a mobile computing device such as a smartphone or tablet computer. It should be understood that this embodiment is illustrative, and should not be construed as being limiting in any way.

The user device 102 can execute an operating system 106, one or more application programs 108, and a security management application 110. The operating system 106 is a computer program for controlling the operation of the user device 102. The application programs 108 and the security management application 110 are executable programs configured to execute on top of the operating system 106 to provide various functions. In particular, the application programs 108 can include any number of natively executed software such as web browsers, text editors, games, social networking applications, messaging applications, telephone applications, email applications, map applications, productivity applications, combinations thereof, or the like. Additionally, or alternatively, the application programs 108 can provide functionality associated with applications by obtaining data 112 from remote devices or services such as, for example, a service 114 executed or otherwise provided by a server computer 116. Thus, it should be understood that the application programs 108 can include natively executed applications, web applications, and/or hybrid applications (wherein some functionality is provided by a locally executed application that can access remotely provided data such as the data 112).

According to various embodiments, the application programs 108 can include various functions and/or associated functionality. For example, in an embodiment in which one of the application programs 108 includes a map application, the map application can include functionality for displaying a map; functionality for displaying a current location in association with a map; functionality for generating navigation directions between two or more geographic locations;

functionality for performing location-based searches; and/or other functionality. Thus, in addition to variations in functionality associated with the application programs 108, the application programs 108 also can include multiple functions and/or functionality of varying types.

According to embodiments of the concepts and technologies disclosed herein, a user, developer, device manufacturer, network operator, and/or other authorized entity can control functionality associated with the application programs 108 by way of a the security management application 110. As will be explained in more detail below, the security management application 110 can be used by an authorized entity to determine an access level granted to various users interacting with the user device 102. Additionally, the security management application 110 can be used by an entity to control tiered access to various multi-function application programs 108 such as the map application mentioned above.

In particular, the security management application 110 can be configured to identify applications installed at the user device 102 and to determine application functions that are to be controlled by the security management application 110. According to various embodiments, an application developer or other entity can specify the functions that are to be controlled. In some other embodiments, the security management application 110 can be configured to analyze program code associated with the application programs 108 to identify functions associated with the application programs 108. A telephone application, for example, can include a function for making and/or accepting phone calls and functionality for accessing voicemail. In such an embodiment, the security management application 110 can be configured to recognize two functions that can be controlled by the security management application 110, namely, phone call functionality and voicemail functionality. The control of these and/or other functions of the application programs 108 are described in additional detail below.

The security management application 110 can be configured to present functionality associated with an application program 108 to a user or other entity, and to provide controls for setting access controls for the functionality. For example, the security management application 110 can generate a user interface for presenting the functionality, for presenting options for controlling access to the functionality, and for obtaining input from an entity with regard to the functionality. Some examples of example user interfaces for controlling application access are illustrated and described below with reference to FIGS. 4A-4D.

As will be explained in more detail below with reference to FIGS. 2-4D, some or even all functionality associated with an application program 108 can be controlled by a single setting. Thus, for example, a user may determine that all phone functions (voicemail and phone call functionality) are to be controlled as a group. In some other embodiments, the security management application 110 can provide various functions associated with the application program 108 for control by the user or other entity. Thus, an entity can control various functions of a particular application program 108 individually and/or as a group.

The concepts and technologies disclosed herein provide users or other entities with the ability to access functionality associated with the application programs 108 when the user device 102 is in a locked state. Although a locked state is referred to herein, it should be understood that the concepts and technologies disclosed herein can be applied to various secured states associated with the user device 102 including, but not limited to, a locked state wherein a security code, passcode, or recognized gesture must be entered to unlock or unsecure the user device 102. Thus, the concepts and technologies disclosed herein can be used to provide secured access and/or to manage secured access to applications without first unlocking the device. As such, the concepts and technologies disclosed herein can allow users to access various levels of functionality, which as mentioned above can be configured by users or other entities, without first deactivating device security. Embodiments of the concepts and technologies disclosed herein can allow users to access navigation instructions while driving, allow other users to play games or execute other functions, while the device owner may be unavailable or where diverting attention to unlock the device may be undesirable.

Additionally, embodiments of the security management application 110 are configured to reconfigure application program 108 access levels based upon various considerations in addition to, or instead of, user choices. For example, the security management application 110 can be configured to access various sensors associated with the user device 102 and/or to access various devices, networks, or nodes in communication with the user device 102 to determine if certain functionality associated with the user device 102 and/or the application programs 108 are to be surfaced or made accessible without first unlocking the device. Some contemplated embodiments of reconfiguring application programs 108 include detecting emergency situations to reconfigure access to telephone functions, messaging functions, and/or other functionality; detecting presence or location at a corporate site to enable certain application programs (such as intranet access, or the like) for any device user; or the like. Additional aspects of the concepts and technologies disclosed herein for reconfiguring application access based upon environmental conditions and/or location will be described in more detail below.

Although the security management application 110 is illustrated as a an application program executed at the user device 102, it should be understood that the security management application 110 may be embodied in stand-alone devices or components thereof operating as part of or in communication with the network 104 and/or the user device 102. As such, the illustrated embodiment should be understood as being illustrative of only some contemplated embodiments and should not be construed as being limiting in any way.

According to various embodiments, settings associated with the application programs 108 and/or their associated functionality can be specified by application developers, device manufacturers, network operators, users, or other entities. Thus, the security management application 110 can be used to change or update access settings associated with the application programs 108, if desired, in addition to or instead of creating the settings.

According to various implementations, a user launches the security management application 110 to tailor access control settings for the application programs 108. In some embodiments, the security management application 110 analyzes the application programs 108 installed and/or otherwise accessible at the user device 102 and compiles a list for presentation in a user interface. As explained above, the security management application 110 also can be configured to determine if more than one level of access are to be configured for one or more of the application programs 108. For example, a user may configure an application program 108 such that some functionality is accessible through a lock screen of the device, while other functionality is not. For purposes of illustrating and describing the concepts and technologies disclosed herein, application programs 108 for which multiple levels of access can be configured are referred to herein as "tiered" application programs 108 and/or access to these application programs 108 is referred to herein as "tiered access."

The security management application 110 can determine if tiered access is to be configured for one or more of the application programs 108. If tiered access is not to be configured for any of the application programs 108, the security management application 110 can set access control settings for the application programs 108. In some embodiments, the security management application 110 can be configured to present a user interface with options for setting the access control settings for the application programs 108. The options can include checkboxes or other UI controls for selecting or deselecting accessibility controls.

If the security management application 110 determines that tiered access is to be configured for one or more of the application programs 108, the security management application can present a user interface for assigning access control for various functions or functionality of the application program 108. It should be understood that the user interface for controlling tiered access of an application program 108 can be accessed via the user interface for presenting the application programs 108 and/or can be accessed via a dedicated user interface. It should be understood that these embodiments are illustrative, and should not be construed as being limiting in any way.

Once access controls have been defined for one or more of the application programs 108 and/or functionality of the application programs 108, the security management application 110 can save the settings. The settings can be saved as device preferences, settings, and/or configurations; application settings or preferences; or the like. The settings can be saved and the security management application 110 can be exited or stopped, if desired.

In some embodiments, if the user device 102 is turned on or brought out of sleep mode, the security management application 110 can be invoked to govern granting and/or denying of access to the application programs 108. Thus, the settings saved by the security management application 110 can be considered a security profile for the device, if desired. Upon being powered on and/or brought out of sleep mode, the security management application 110 can be configured to collect environmental and/or location information such as ambient noise levels, ambient light levels, geographic location, network surveys, local devices and/or networks, or the like. Based upon these and/or other considerations, the security management application 110 can be configured to grant access to application programs 108 and/or functionality of the application programs 108 whether or not the security policy allows access and/or whether or not the user device 102 has been unlocked. These and other aspects of the security management application 110 will be described in more detail below.

"Emergencies" and/or "emergency situations," as used herein, can refer to operating conditions that are outside of what is considered a normal or average operating state. For example, an "emergency" state can include a state in which a fire, health, or police emergency is occurring at or in proximity to the user device 102. Thus, for example, the user device 102 can be configured to detect a smoke alarm, a fire alarm, a burglar alarm, or the like; to detect excessive sounds, heat, temperature fluctuations; or the like, by accessing various sensors as described herein. Additionally, it should be understood that that an "emergency" state or "emergency situation" can be determined to exist based upon a literal assertion of such a state. For example, a network, device, or node in communication with the user device 102 may inform the user device 102 that such a state exists. In some contemplated embodiments, a national or regional emergency system may inform the user device 102 of an emergency situation. These and/or other types of literally asserting emergency conditions may be dictated by regulations or business agreements with the phone account owner, network operations, or the like. In one embodiment, the user device 102 can determine that an emergency condition exists based upon information received from a Commercial Mobile Alert System ("CMAS"), also referred to as Emergency Cell Broadcast. It should be understood that these embodiments are illustrative, and should not be construed as being limiting in any way.

It should be appreciated that in some embodiments, the "functions" and/or functionality of the application programs 108 have been described as being exposed to and/or determinable by the security management application 110. It should be understood that this embodiment is illustrative, and should not be construed as being limiting in any way. In particular, it should be understood that in some embodiments, functions and/or functionality of the application programs 108 may be contextual, and that the security management application 110 may not determine what functions or functionality exist in an application program 108 that are worthy of access control. Thus, in some embodiments, the security management application 110 can access an interface such as an API configured to allow querying or calls to query the application program 108 for a manifest of functions and/or associated textual descriptions of the functions (if included).

In some embodiments, application programs 108 can be configured with default behavior in the event that listing and/or delivering lists of functions associated with the application programs 108 may be impractical or undesirable to list every function and/or to require or expect a user to choose a behavior for each function. As such, a default action such as, for example, "all other functionality accessible in authenticated mode only," or the like, may be a useful built-in behavior. The query could also be accomplished by reading a device manifest that can be delivered with each application program 108 at installation time and installed in the operating system 106 as a permanent part of the application program 108 residing in the user device 102. The manifest can, in some embodiments, include details used by the security management application 110 to offer the functions and/or choices described herein.

It should be understood that the user device 102 can also be configured to execute policy configuration roles and the policy enforcement roles. Thus, while not shown in FIG. 1, the user device 102 also can be configured to execute a security policy enforcement application. Thus, while security policy configuration and policy enforcement are described herein, it should be understood that that these and other roles may be executed by different applications. Additionally, the security management application 110 may execute realtime and/or in non-realtime, thereby enabling users to review and set security configuration policies (and/or enforcement mechanisms) at any time. In some embodiments, the user device 102 can execute or provide an agent that can run in realtime to enforce security settings including defined overrides and/or using any sensors.

FIG. 1 illustrates one user device 102, one network 104, and one server computer 116. It should be understood, however, that various implementations of the operating environment 100 include multiple user device 102, multiple networks 104, and/or multiple server computers 116. As such, the illustrated embodiment should be understood as being illustrative, and should not be construed as being limiting in any way.

Figure 2:
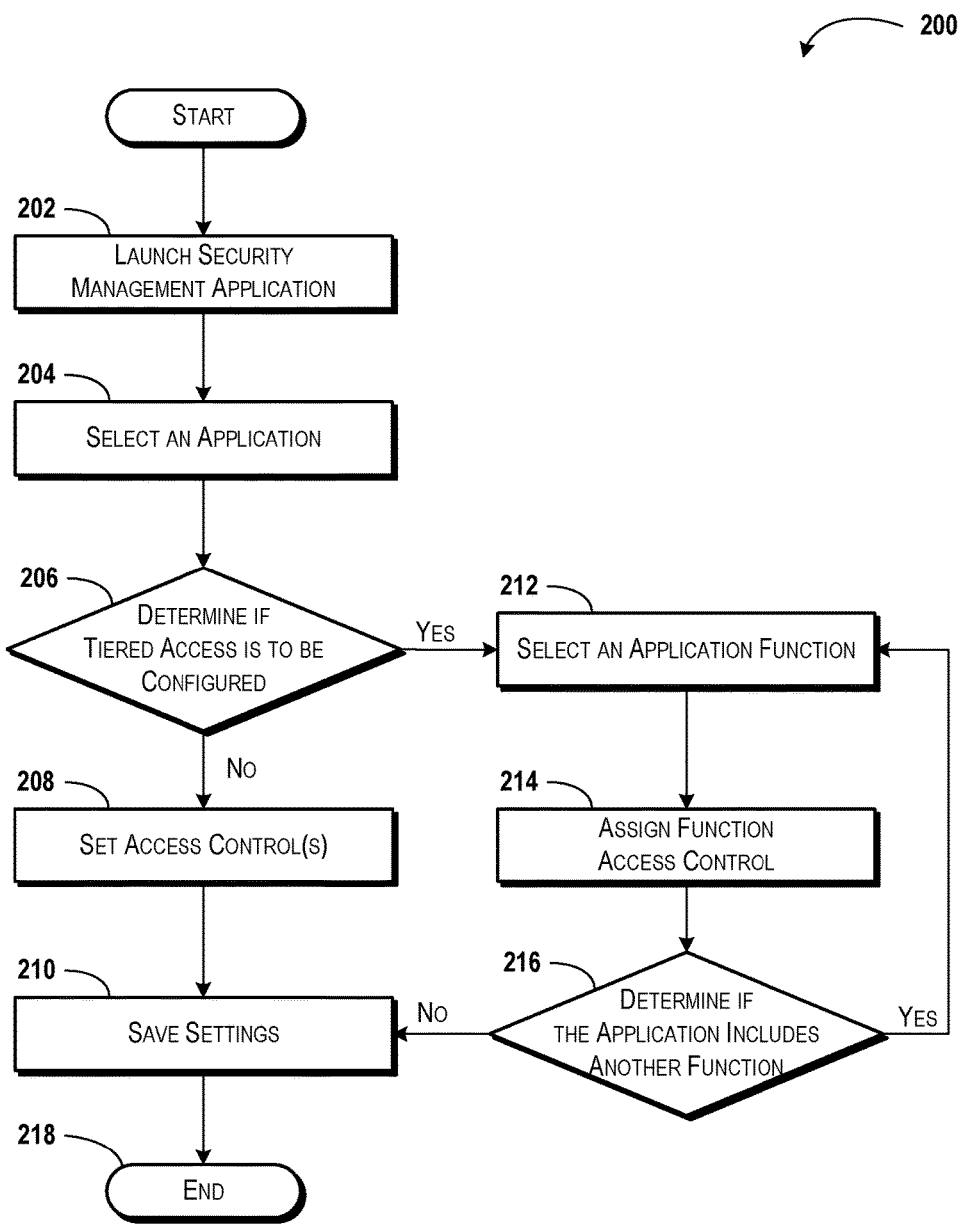
FIG. 2 is a flow diagram showing aspects of a method for managing application access settings, according to an illustrative embodiment.

Turning now to FIG. 2, aspects of a method 200 for managing application access settings will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used in the herein, is used expansively hereinto include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof.

For purposes of illustrating and describing the concepts of the present disclosure, the methods disclosed herein are described as being performed by the user device 102 via execution of one or more software modules such as, for example, the security management application 110. It should be understood that additional and/or alternative devices and/or network nodes can provide the functionality described herein via execution of one or more modules, applications, and/or other software including, but not limited to, the security management application 110. Thus, the illustrated embodiments are illustrative, and should not be viewed as being limiting in any way.

The method 200 begins at operation 202, wherein the user device 102 launches the security management application 110. According to various embodiments, the functionality associated with the security management application 110 can be accessed via the device settings or preferences. In other embodiments, the functionality of the security management application 110 can be accessed via selection of an icon on a device menu, screen, desktop, or the like. In yet other embodiments, the security management application 110 can be launched when applications are installed or purchased at the user device 102. Because the functionality described herein with respect to the security management application can be accessed at various times and/or in response to various activities, it should be understood that these embodiments are illustrative, and should not be construed as being limiting in any way.

From operation 202, the method 200 proceeds to operation 204, wherein an application such as one of the application programs 108 is selected. Although not explicitly shown in FIG. 2, the security management application 110 can be configured to generate a list of application programs 108 installed and/or otherwise accessible at the user device 102, and to present the list to a user or other entity. Thus, the selection of the application program 108 can include selection of an icon or other indicator associated with the application program 108, if desired.

From operation 204, the method 200 proceeds to operation 206, wherein the user device 102 determines if tiered access is to be configured for an application such as the application program 108 selected in operation 204. As explained above, "tiered access" as described herein can be used to refer to application programs 108 for which various functionality and/or functions can be separately configured to allow and/or disallow interactions without unlocking the user device 102. As such, the concepts and technologies disclosed herein can be used to configure different access levels for particular application programs 108 instead of, or in addition to, enabling or disabling access with the application programs 108 categorically.

As such, the concepts and technologies disclosed herein can be used to allow or disallow some types of interactions with application programs 108 when the user device 102 is locked. In one contemplated example, a user may be able to author short message service ("SMS") messages while the user device 102 is locked, but may be disallowed from authoring multimedia message service ("MMS") messages while the user device 102 is locked. As such, while both SMS and MMS messaging may be enabled by a single messaging application, a user may configure these two functions of the messaging program separately in some embodiments, thereby allowing a user to provide tiered access to the messaging application. Because this example of tiered access is merely illustrative, this embodiment should not be construed as being limiting in any way.

If the user device 102 determines, in operation 206, that tiered access is not to be configured, the method 200 proceeds to operation 208. In operation 208, the user device 102 can set one or more access controls for the application program 108. As such, it can be appreciated that in operation 208, the user device 102 can configure one or more settings for allowing or disallowing access to the application program 108 when the user device 102 is in a secured or locked state and/or at other times. According to various embodiments, a user device 102 can present a user interface for setting access controls for the application program 108. The list can be presented in a user interface with various types of UI controls for specifying a choice or setting associated with the application program 108.

From operation 208, the method 200 proceeds to operation 210, wherein the user device 102 saves settings reflecting the access set in operation 208. In some embodiments, upon exiting the user interface, the user device 102 can store data reflecting the access control or other security setting associated with the application program 108. The access control, security setting, or other data can be stored in a database or other data structure at the user device 102 and/or at a remote data storage device. Thus, a user can specify that a particular application program 108 will be accessible and/or will be inaccessible when the user device 102 is in a locked state. These and other settings and/or configurations with regard to access controls can be specified in operation 210.

According to various embodiments, the user device 102 can save the access settings as a list of application programs 108 with binary indications such as "yes/no," "true/false," "0/1," or the like that indicate whether or not access to the application programs 108 is allowed when the user device 102 is locked. In some other embodiments, the user device 102 can save the indications, for example, by maintaining a list of application programs 108 that can be accessed when the user device 102 is locked, by maintaining a list of application programs 108 that cannot be accessed when the user device 102 is locked, or the like. Because the settings can be saved in a number of ways, it should be understood that these embodiments are illustrative, and should not be construed as being limiting in any way.

If the user device 102 determines, in operation 206, that tiered access is to be configured for the application program 108 selected in operation 204, the method 200 proceeds to operation 212, wherein an application function is selected. Although not explicitly shown in FIG. 2, the security management application 110 can be configured to generate a list of application functions associated with the application program 108 selected in operation 204, and to present the list to a user or other entity. Thus, the selection of the application program 108 can include selection of an icon or other indicator associated with the application program 108, if desired.

From operation 212, the method 200 proceeds to operation 214, wherein the user device 102 can assign a function access control to the application function selected in operation 212. It should be appreciated that one or more functions associated with an application program 108 can be presented to a user in a user interface with one or more UI controls for specifying a setting or preference with regard to access controls for the one or more functions. Thus, a user can specify that a particular function will be accessible and/or will be inaccessible when the user device 102 is in a locked state. These and other settings and/or configurations with regard to access controls can be specified in operation 214.

From operation 214, the method 200 proceeds to operation 216, wherein the user device 102 determines if the application being analyzed for tiered access controls in operations 212-214 includes another function. In some embodiments, the user device 102 can generate a list of functions for the application being analyzed, and determine if each of the determined functions has been configured with regard to access control in operation 216. In some other embodiments, the user device 102 can present the list of functions in a user interface with UI controls for setting the access controls.

In some embodiments, the user interface can include an "ACCEPT," "DONE," "OKAY," "COMMIT," or other UI control for indicating that configuration of the access controls has been completed. As such, operation 216 can include receiving data indicating selection of a UI control and/or analysis of functions associated with the application being configured. Because the user device 102 can be configured to determine that additional functions are or are not included in the application in additional and/or alternative ways, it should be understood that these embodiments are illustrative, and should not be construed as being limiting in any way. From operation 210, the method 200 proceeds to operation 218. The method 200 ends at operation 218.

Figure 3:
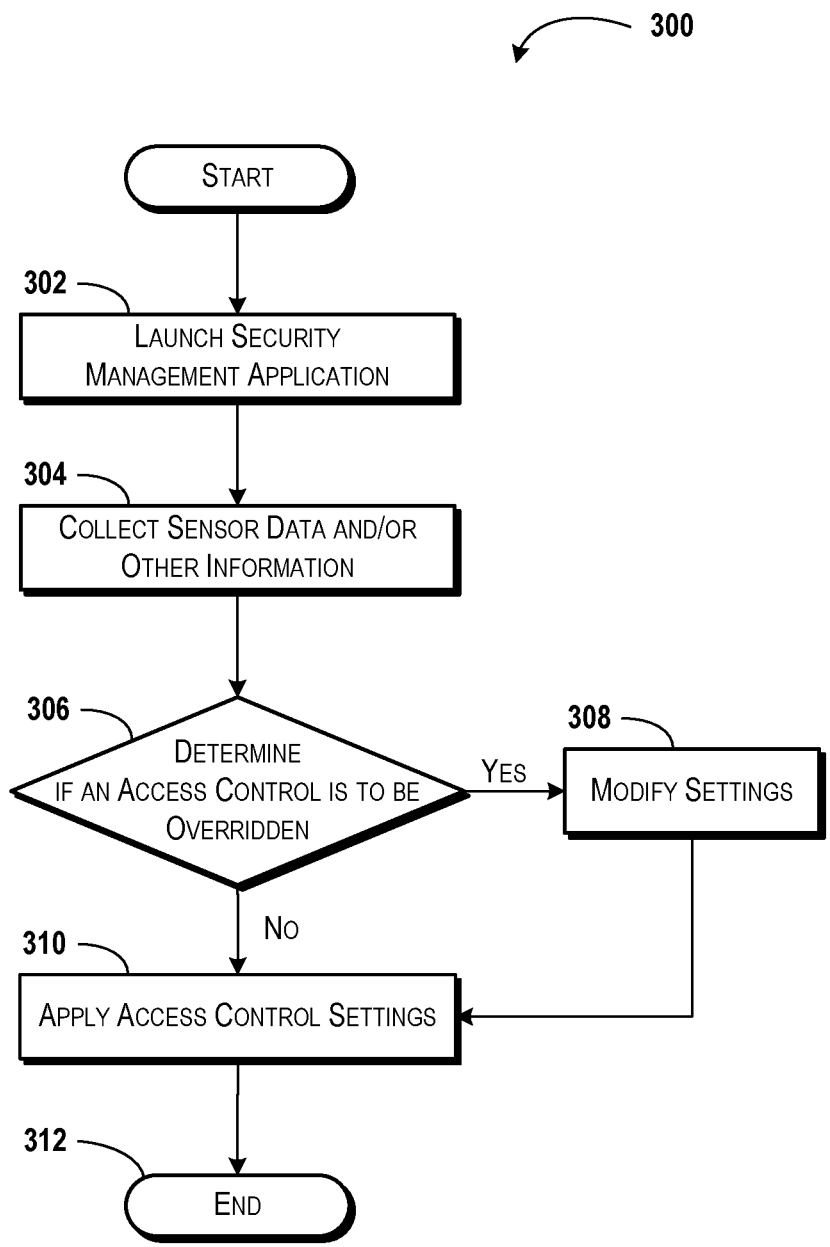
FIG. 3 is a flow diagram showing aspects of a method for managing application access settings, according to another illustrative embodiment.

Turning now to FIG. 3, aspects of a method 300 for managing application access settings will be described in detail, according to another illustrative embodiment. The method 300 begins at operation 302, wherein the user device 102 launches the security management application 110. In the method 300, the security management application 110 can be launched in response to powering on the user device 102, in response to bringing the user device 102 out of a sleep mode, and/or otherwise encountering a lock screen of the user device 102. In one contemplated example embodiment, the user device 102 is picked up by a person during an emergency situation, wherein the person is not an authorized user of the user device 102. In another contemplated example, the user device 102 is picked up by a person at an office, factory, or the like, wherein the person is not the authorized user of the user device 102, but the person is a member of an organization with which the user device 102 is associated. Other embodiments are contemplated and are possible for activating the security management application 110. As such, it should be understood that these embodiments are illustrative, and should not be construed as being limiting in any way.

According to various embodiments, the security management application 110 can be launched each time the user device 102 is powered on or brought out of a sleep mode. The security management application 110 can determine and apply a security policy or other security settings associated with the user device 102. As disclosed herein, the security settings can define, among other things, application programs 108 and/or functions of application programs 108 that are to be made available to a user of the user device 102 when the user device 102 is locked. The security management application 110 also can be configured to determine, based upon various considerations discussed in more detail below, if the security settings are to be overridden at a particular time.

From operation 302, the method 300 proceeds to operation 304, wherein the user device 102 collects sensor data and/or other information at the user device 102. According to various embodiments, the user device 102 can collect the sensor information by accessing various onboard sensors associated with the user device 102 and/or remote sensors in communication with the user device 102. According to various embodiments, for example, the user device 102 can collect the sensor information from, for example, accelerometers, gyroscopes, compasses, and/or other orientation sensors; light sensors; proximity sensors; temperature sensors; air quality, smoke, fire, and/or chemical sensors; biometric devices; microphones, decibel meters, and/or other sound sensors; cameras and/or other optical devices or detectors; infrared sensors; and/or other sensors or devices of the user device 102 and/or in communication with the user device 102. The user device 102 also can collect general information and/or user information such as, for example, time and date information; calendar information such as appointments and/or events; messaging information; or the like.

The user device 102 also can collect location information. According to various embodiments, the user device 102 can collect location information using, for example, global positioning system ("GPS") devices; proximity to location beacons; radio receivers, transmitters, and/or transceivers; cellular network locating devices; combinations thereof, or the like. While the above list is extensive, it should be understood that any technology for locating the user device 102 can be used to provide location information accurate to various levels of granularity such as, for example, hundreds of meters, tens of meters, meters, and/or portions of meters. As such, the above examples of location determination devices should be understood as being illustrative, and should not be construed as being limiting in any way.

From operation 304, the method 300 proceeds to operation 306, wherein the user device 102 determines if an access control or other security setting associated with the user device 102 is to be overridden. As explained above, particularly with respect to FIG. 2, the user device 102 can be configured to save access control and/or other security settings associated with the user device 102. Thus, in operation 306, the user device 102 can determine, based at least partially upon the information collected and/or otherwise obtained in operation 304, if the access controls and/or security settings are to be overridden.

In one contemplated example, the user device 102 may determine, based upon an ambient sound level, that an emergency situation exists in the proximity of the user device 102. In another contemplated example, the user device 102 may determine, based upon a determined location, that the user device 102 is located within a place of business associated with the user device 102. Thus, the user device 102 can be configured to determine, based upon the location, that any person who activates the user device 102 (within the place of business) is an authorized person who is to be given access to at least some application programs 108 and/or functionality of the application programs 108. Thus, a business may configure the user device 102 to recognize that the user device 102 is a business asset and to make itself at least partially available to anyone at the place of business. Because various types of information can be collected by the user device 102 as explained above with reference to operation 304, it should be understood that these embodiments are illustrative, and should not be construed as being limiting in any way.

If the user device 102 determines, in operation 306, that the access controls and/or security settings are to be modified, the method 300 proceeds to operation 308. In operation 308, the user device 102 modifies one or more of the settings associated with the access controls and/or other security settings. Thus, for example, the user device 102 can indicate that a particular application program 108 and/or functionality associated with a particular application program 108 is to be allowed, even if a security setting or access control conflicts with such an indication. Additionally, or alternatively, the user device 102 can authorize types, groups, and/or categories of application programs 108 or functionality of application programs 108 in response to such a determination. As such, it should be understood that the user device 102 can be configured to modify any number of the settings in operation 308.

According to various embodiments, the user device 102 can modify the settings for a single instance of an application program 108, for a time limit, and/or for other amounts of time, instances of activity, or the like. Thus, in the event of an emergency, for example, the user device can modify the settings or access controls for a single interaction with the user device 102, and then the settings can revert to their previous settings. If the user device 102 is again activated after the emergency is over, the user device 102 can be configured to activate the security management application 110 again. In this subsequent activation of the security management application 110, the security management application 110 can determine if the settings are to be modified again and/or if the security policy, access controls, and/or other security settings are to be applied without modification. It should be understood that these embodiments are illustrative, and should not be construed as being limiting in any way.

From operation 308, the method 300 proceeds to operation 310. The method 300 also can proceed to operation 310 from operation 306, if the user device 102 determines that the access controls or other security settings are not to be overridden. In operation 310, the user device 102 can apply the access control settings. It can be appreciated from the description of operations 306-308 that the user device 102 can apply the access controls and/or security settings as previously saved and/or as modified in operation 308. As such, the user device 102 can allow access to the application programs 108 and/or functionality of the application programs 108 based upon the security settings and/or determined conditions in proximity to the user device 102. From operation 310, the method 300 proceeds to operation 312. The method 300 ends at operation 312.

Figure 4A:
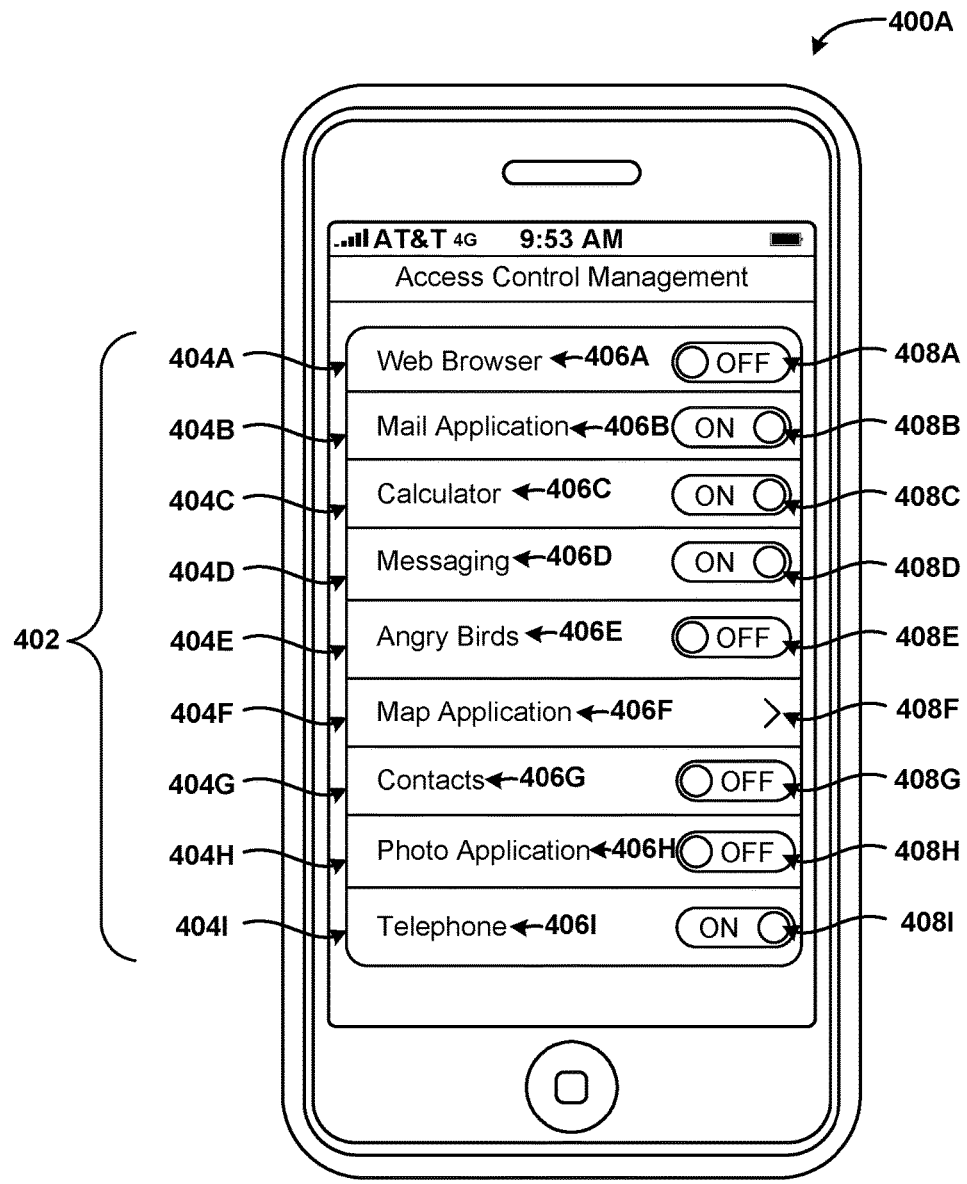
FIGS. 4A-4D are user interface ("UI") diagrams showing aspects of UIs for providing management of application access, according to some illustrative embodiments.

Turning now to FIGS. 4A-4G, UI diagrams showing various aspects of the concepts and technologies disclosed herein for providing management of application access will be described according to various illustrative embodiments. FIG. 4A shows an illustrative screen display 400A generated by a device such as the user device 102, for example, by execution of the security management application 110 described herein. It should be appreciated that the UI diagram illustrated in FIG. 4A is illustrative of one contemplated embodiment, and therefore should not be construed as being limited in any way.

Although not shown in FIG. 4A, the screen display 400A can include various menus and/or menu options. The screen display 400A also can include an access control management list 402. The access control management list 402 can include a number of rows 404A-I (hereinafter collectively and/or generically referred to as "rows 404"). The rows 404 can correspond to applications for which access controls can be configured as disclosed herein. It should be understood that access controls for applications such as the application programs 108 described herein can be provided as settings or configurations within the application programs 108 in addition to, or instead of, presentation in the access control management list 402 shown in FIG. 2. As such, the illustrated embodiment should be understood as being illustrative and should not be construed as being limiting in any way.

Each of the rows 404 can include an indication 406 of the application program 108 to which the row 404 corresponds. The rows 404 also can include one or more UI controls 408A-I (hereinafter collectively and/or generically referred to as "UI controls 408"). The UI controls 408 can be used to set access controls and/or security settings for the application program 108 to which the row 404 corresponds and/or for accessing a tiered access control menu for the application program 108. For example, as shown with respect to the row 404F, the UI control 408F can be used to access a tiered access control list for the application program 108 to which row 404F corresponds, namely, a "map application." It should be understood that this embodiment is illustrative, and should not be construed as being limiting in any way.

It can be appreciated that the UI controls 408 can be used to enable access to the application programs 108 through a lock screen without entering a passcode, password, biometric indicator, or other data for accessing full functionality associated with the user device 102. As such, the UI controls 408A-E and 408G-I can be used to turn on or off lock screen access to the application programs 108. The UI control 408F can be used to access additional and/or alternative settings associated with tiered access, as mentioned above and as illustrated and described below with reference to FIG. 4B.

While only single UI controls 408 are shown in the screen display 400A, it should be understood that multiple UI controls 408 corresponding to multiple preferences, settings, and/or configurations can be presented. For example, in some embodiments, users can define particular gestures that can be used to access functionality associated with the application programs 108 through the lock screen such as, for example, taps at certain locations on display screen, movements or gestures on the display screen, movements or gestures at or near the user device 102, sounds or voice commands, movements of the user device 102, or the like. As such, the illustrated embodiment should be understood as being illustrative and should not be construed as being limiting in any way.

Figure 4B:
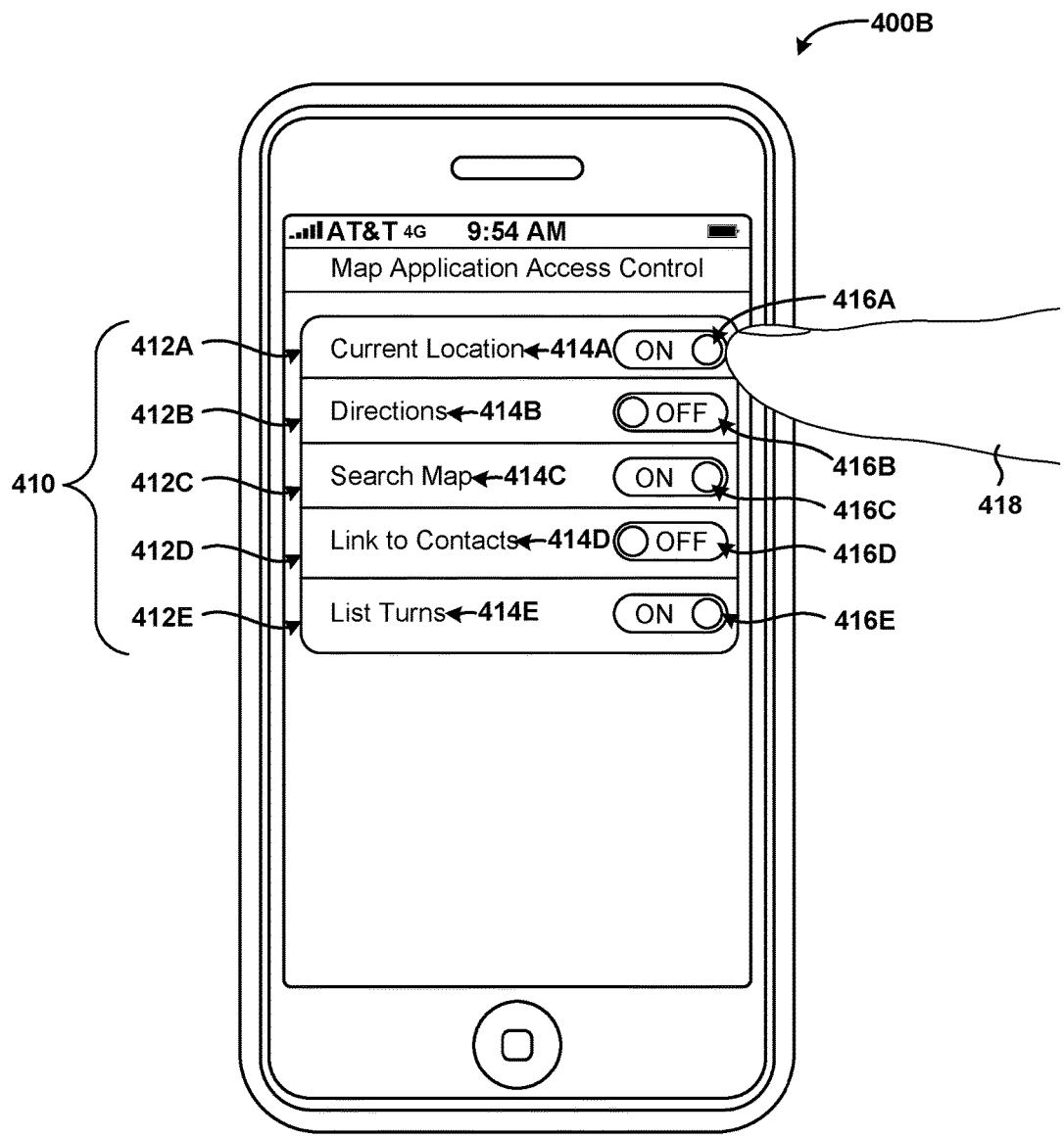

Referring now to FIG. 4B, a UI diagram showing additional aspects of the concepts and technologies disclosed herein for providing management of application access are described in detail. In particular, FIG. 4B shows a screen display 400B generated by a device such as the user device 102. In some embodiments, the screen display 400B can be generated by the user device 102 in response to detecting a tap, touch, gesture, keystroke, voice command, or other input for activating the UI control 406F shown in FIG. 4A. Because the illustrated access control management list 402, the rows 404, and/or the UI controls 408 are merely illustrative of one contemplated embodiment, it should be understood that this embodiment is illustrative, and should not be construed as being limiting in any way.

The screen display 400B includes an application function access control list 410. The application function access control list 410 can be used to allow users to control various functions of a particular application program 108 as described herein. Because the "map application" illustrated in FIG. 4A is merely illustrative of one application for which tiered access can be configured, it should be understood that the application function access control list 410 and the contents thereof are merely illustrative and should not be construed as being limiting in any way.

The application function access control list 410 includes one or more rows 412A-E (hereinafter collectively and/or generically referred to as "rows 412"). The rows 412 can correspond to one or more functions associated with the application program 108 with which the application function access control list 410 corresponds. The rows 412 can include indicators 414 for indicating a particular function or functionality associated with the application program 108 for which access controls are to be configured. The rows 412 also can include UI controls 416A-E (hereinafter collectively and/or generically referred to as "UI controls 416"). The UI controls 416 can be used to control access controls and/or other security settings associated with the functions and/or functionality of the application programs 108 indicated by the indicators 414. While only single UI controls 416 are shown in the screen display 400B for each of the rows 412, it should be understood that multiple UI controls 416 corresponding to multiple preferences, settings, and/or configurations can be presented. As such, it should be understood that this embodiment is illustrative, and should not be construed as being limiting in any way.

As shown in FIG. 4B, a user can turn on or turn off access for the functions of the application program 108 shown in FIG. 4B by way of selection of the UI controls 416 via touch gestures made with a finger 418. Because other input mechanisms are possible and are contemplated, it should be understood that this embodiment is illustrative and should not be construed as being limiting in any way. As explained above, the user can specify, by way of the screen display 400B, whether the particular functions shown in FIG. 4B are or are not to be accessible without first unlocking the user device 102. As explained above, these settings can be saved. Additionally, it should be understood that these settings can be overridden based upon environmental and/or other conditions or data as explained above with reference to FIG. 3.

Figure 4C:
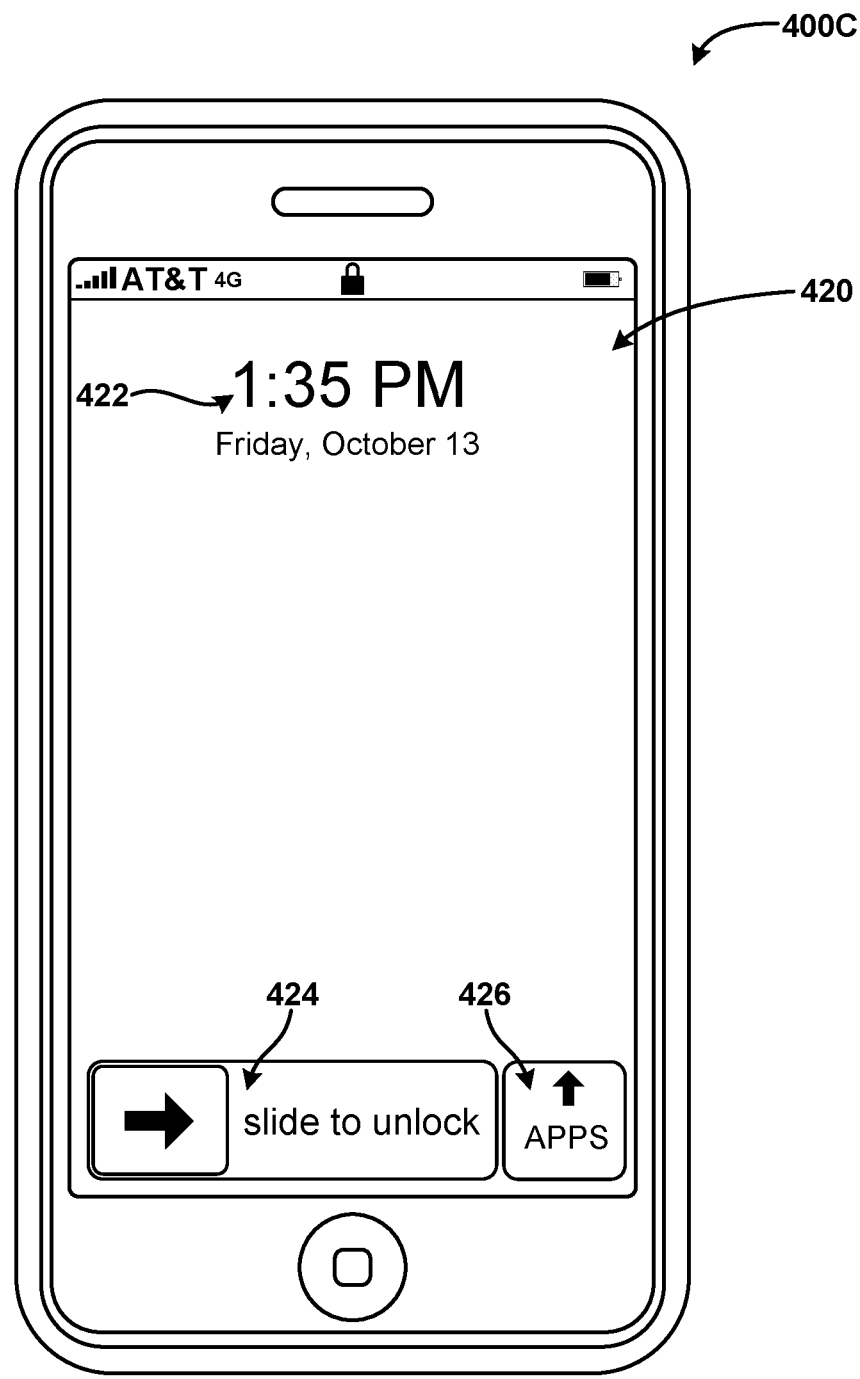

In FIG. 4C, additional aspects of the concepts and technologies disclosed herein for management of application access are illustrated, according to an illustrative embodiment. FIG. 4C shows an illustrative screen display 400C generated by a device such as the user device 102, for example, by execution of the security management application 110 described herein. It should be appreciated that the UI diagram illustrated in FIG. 4C is illustrative of one contemplated embodiment, and therefore should not be construed as being limited in any way.

In FIG. 4C, the user device 102 is displaying a lock screen 420. The lock screen 420 can include various types of information in addition to, or instead of, the illustrated information. In the illustrated embodiment, the lock screen 420 includes a time and date display 422 and a UI control 424 for unlocking the user device 102. According to various embodiments, the UI control 424, when activated by a user or other entity, can cause the user device 102 to present a passcode screen (not illustrated). The passcode screen can be used to enter a passcode for unlocking the device. According to various embodiments of the concepts and technologies disclosed herein, a user may wish to access functionality associated with the device without first entering a passcode or accessing a passcode screen for various reasons. For example, the user may be driving and may not wish to divert his or her attention to enter a passcode. Alternatively, a user may not know a passcode for the user device 102 but may wish to access some application programs 108 as described herein for various purposes.

As such, the lock screen 420 can include a UI control 426, the selection of which can cause the user device 102 to display application programs 108 and/or functionality of application programs 108 that can be accessed without first entering a passcode. In some embodiments, as described herein, the UI control 426 can be omitted, and the application programs 108 and/or functionality of the application programs 108 can be displayed without interacting with a UI control 426. Rather, as mentioned above, the application programs 108 and/or functionality of the application programs 108 can be displayed in response to various gestures, voice commands, keystrokes, and/or other input. As such, the illustrated embodiment should be understood as being illustrative and should not be construed as being limiting in any way. In some embodiments, the UI control 426 can correspond to a structured UI for listing freely accessible apps, for example, if a user does not remember gestures for accessing the applications and/or if some applications do not have gestures associated with them.

Figure 4D:
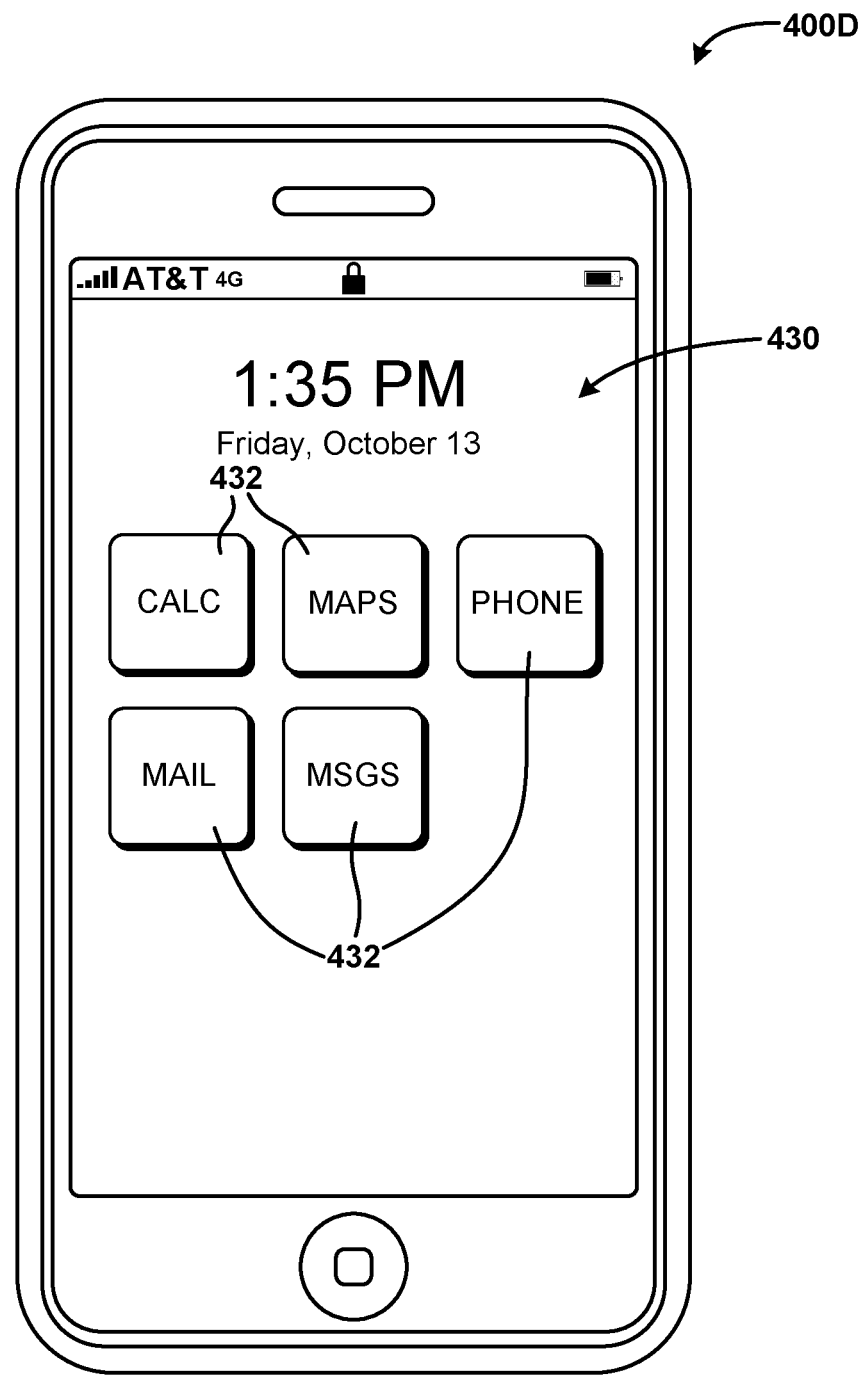

Turning now to FIG. 4D, a UI diagram showing additional aspects of the concepts and technologies disclosed herein for providing management of application access are described in detail. In particular, FIG. 4D shows a screen display 400D generated by a device such as the user device 102. The screen display 400D can be, but is not necessarily, displayed by the user device 102 in response to a user selecting the UI control 426 illustrated and described above with reference to FIG. 4C and/or in response to other input such as gestures, taps, voice commands, or the like. Because the screen display 400D can be displayed at other times, it should be understood that this embodiment is illustrative, and should not be construed as being limiting in any way.

As shown in FIG. 4D, the user device 102 can be configured to display an application access screen 430 or other user interface for providing a list of application programs 108 and/or functionality of application programs 108 that are accessible via the lock screen 420. Thus, the application access screen 430 can provide UI controls 432 such as icons for accessing the available application programs 108 and/or functionality of the application programs 108.

As explained above, some application programs 108 can be configured to provide tiered access to the application programs 108. As such, in some embodiments, the functions of the application programs 108 can be displayed on the application access screen 430. In some other embodiments, icons or UI controls for accessing application programs 108 that have tiered access wherein one or more functions of the application program 108 are and/or are not accessible via the lock screen 420 are displayed. When the application program 108 is accessed via the application access screen 430, only functions that have been allowed function and/or are displayed. Thus, unavailable functions can be shaded, omitted from a display, and/or displayed with an indication that a passcode must be entered (or another action taken) to unlock the user device 102 and/or the associated functionality of the application program 108. It should be understood that these embodiments are illustrative, and should not be construed as being limiting in any way.

Figure 5:
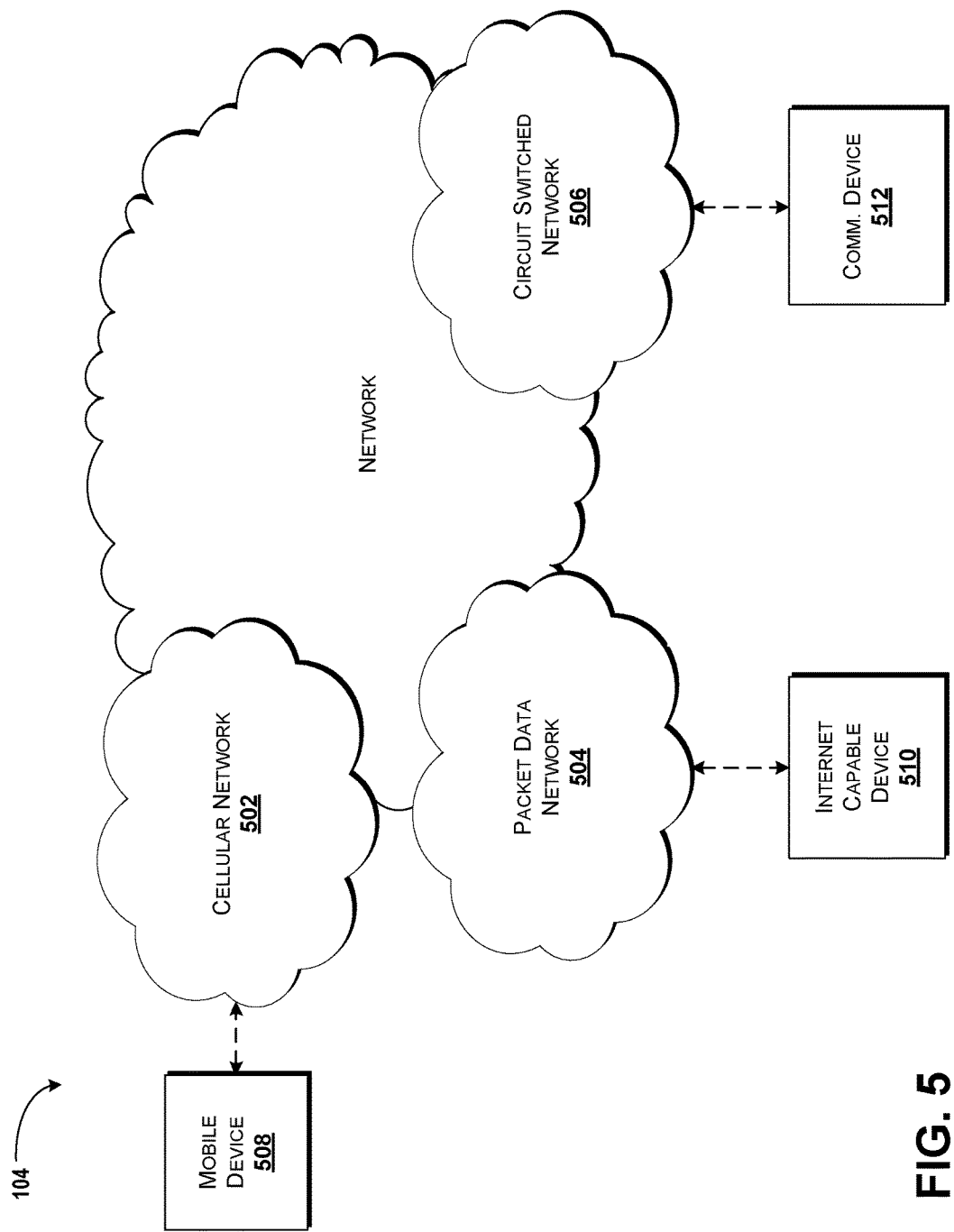
FIG. 5 schematically illustrates a network, according to an illustrative embodiment.

Turning now to FIG. 5, additional details of the network 104 are illustrated, according to an illustrative embodiment. The network 104 includes a cellular network 502, a packet data network 504, for example, the Internet, and a circuit switched network 506, for example, a publicly switched telephone network ("PSTN"). The cellular network 502 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 502 also includes radios and nodes for receiving and transmitting voice, data, and combinations thereof to and from radio transceivers, networks, the packet data network 504, and the circuit switched network 506.

A mobile communications device 508, such as, for example, a cellular telephone, a user equipment, a mobile terminal, a PDA, a laptop computer, a handheld computer, and combinations thereof, can be operatively connected to the cellular network 502. The cellular network 502 can be configured as a 2G GSM network and can provide data communications via GPRS and/or EDGE. Additionally, or alternatively, the cellular network 502 can be configured as a 3G UMTS network and can provide data communications via the HSPA protocol family, for example, HSDPA, EUL (also referred to as HSUPA), and HSPA+. The cellular network 502 also is compatible with 4G mobile communications standards as well as evolved and future mobile standards.

The packet data network 504 includes various devices, for example, servers, computers, databases, and other devices in communication with one another, as is generally known. The packet data network 504 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 504 includes or is in communication with the Internet. The circuit switched network 506 includes various hardware and software for providing circuit switched communications. The circuit switched network 506 may include, or may be, what is often referred to as a plain old telephone system (POTS). The functionality of a circuit switched network 506 or other circuit-switched network are generally known and will not be described herein in detail.

The illustrated cellular network 502 is shown in communication with the packet data network 504 and a circuit switched network 506, though it should be appreciated that this is not necessarily the case. One or more Internet-capable devices 510, for example, a PC, a laptop, a portable device, or another suitable device, can communicate with one or more cellular networks 502, and devices connected thereto, through the packet data network 504. It also should be appreciated that the Internet-capable device 510 can communicate with the packet data network 504 through the circuit switched network 506, the cellular network 502, and/or via other networks (not illustrated).

As illustrated, a communications device 512, for example, a telephone, facsimile machine, modem, computer, or the like, can be in communication with the circuit switched network 506, and therethrough to the packet data network 504 and/or the cellular network 502. It should be appreciated that the communications device 512 can be an Internet-capable device, and can be substantially similar to the Internet-capable device 510. In the specification, the network 104 is used to refer broadly to any combination of the networks 502, 504, 506. It should be appreciated that substantially all of the functionality described with reference to the network 104 can be performed by the cellular network 502, the packet data network 504, and/or the circuit switched network 506, alone or in combination with other networks, network elements, and the like.

According to various implementations, the user device 102 can include and/or can use any combination of the devices disclosed herein including, but not limited to, the mobile communications device 508, the Internet-capable device 510, and/or the communications device 512 to access web pages or other resources, to access the server computer 116, to transmit and/or receive the data 112 and/or for other interactions between the user device 102, the server computer 116, and/or other entities (not illustrated). As such, it should be understood that the user device 102 can interact with the server computer 116 and/or other devices, networks, services, or nodes via any number and/or combination of devices and networks.

Figure 6:
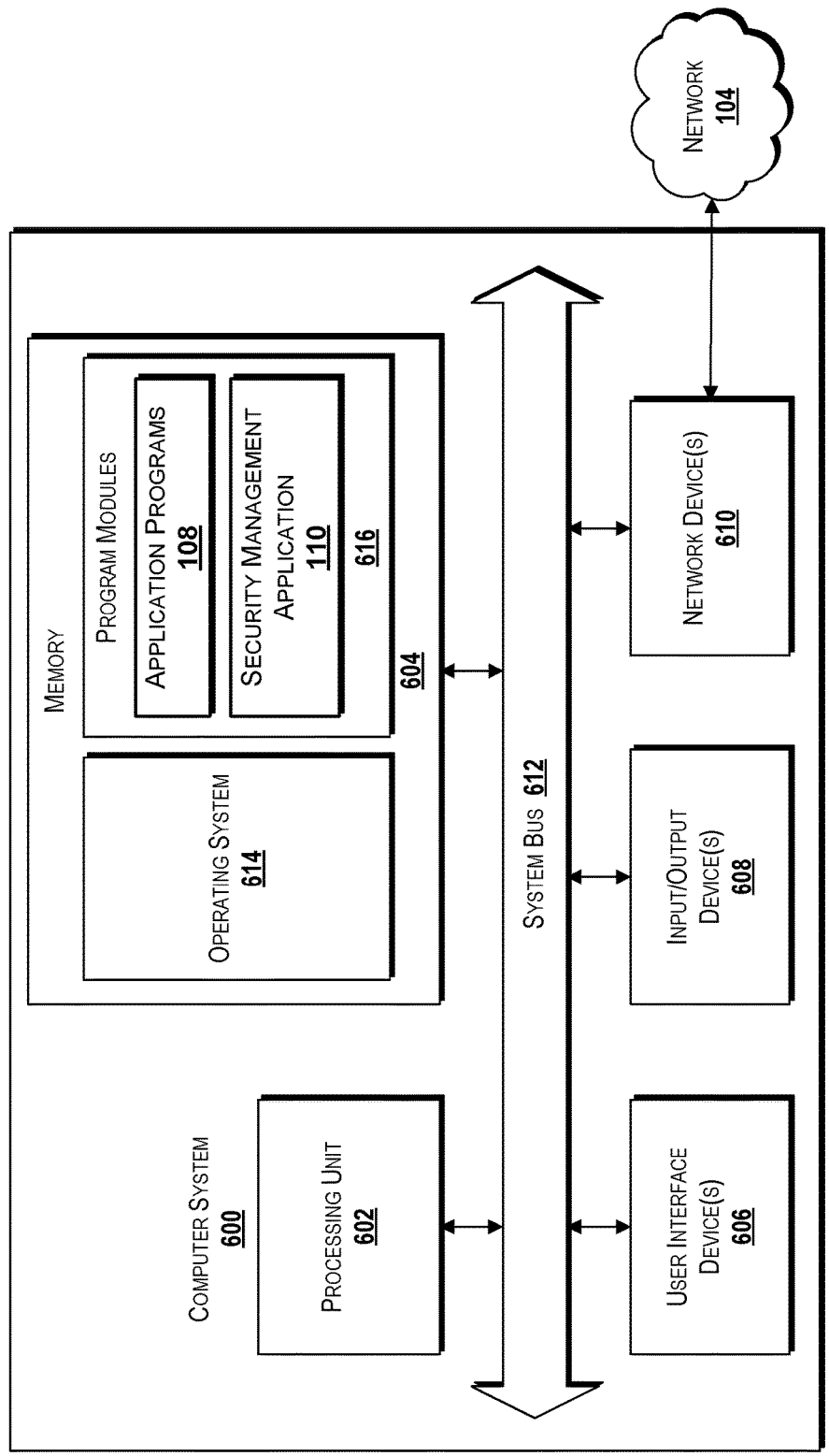
FIG. 6 is a block diagram illustrating an example computer system configured to provide management of application access, according to some illustrative embodiments.

FIG. 6 is a block diagram illustrating a computer system 600 configured to provide the functionality described herein for management of application access, in accordance with various embodiments of the concepts and technologies disclosed herein. The computer system 600 includes a processing unit 602, a memory 604, one or more user interface devices 606, one or more input/output ("I/O") devices 608, and one or more network devices 610, each of which is operatively connected to a system bus 612. The bus 612 enables bi-directional communication between the processing unit 602, the memory 604, the user interface devices 606, the I/O devices 608, and the network devices 610.

The processing unit 602 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein.

The memory 604 communicates with the processing unit 602 via the system bus 612. In some embodiments, the memory 604 is operatively connected to a memory controller (not shown) that enables communication with the processing unit 602 via the system bus 612. The memory 604 includes an operating system 614 and one or more program modules 616. The operating system 614 can include, but is not limited to, members of the WINDOWS and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS and/or iOS families of operating systems from APPLE CORPORATION, the FREEBSD family of operating systems, the SOLARIS family of operating systems from ORACLE CORPORATION, the ANDROID family of operating systems from GOOGLE INCORPORATED, other operating systems, and the like. Additionally, or alternatively, the operating system 614 can include open source operating systems such as, for example, the TIZEN and/or BOOT2GECKO operating systems, or other proprietary operating systems. Because other operating systems can be included, the above examples should be understood as being illustrative and should not be construed as being limiting in any way.

The program modules 616 may include various software and/or program modules described herein. In some embodiments, for example, the program modules 616 include the application programs 108, the security management application 110, and/or other applications or software described herein. These and/or other programs can be embodied in computer-readable media containing instructions that, when executed by the processing unit 602, perform one or more of the methods 200, 300 described in detail above with respect to FIGS. 2-3. According to embodiments, the program modules 616 may be embodied in hardware, software, firmware, or any combination thereof. Although not shown in FIG. 6, it should be understood that the memory 604 also can be configured to store the data 112, a security policy and/or security settings, access control lists, and/or other data, if desired.

By way of example, and not limitation, computer-readable media may include any available computer storage media or communication media that can be accessed by the computer system 600. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 600. In the claims, the phrase "computer storage medium" and variations thereof, does not include waves, signals, and/or other transitory and/or intangible communication media, per se.

The user interface devices 606 may include one or more devices with which a user accesses the computer system 600. The user interface devices 606 may include, but are not limited to, computers, servers, personal digital assistants, cellular phones, or any suitable computing devices. The I/O devices 608 enable a user to interface with the program modules 616. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a display screen or a printer.

The network devices 610 enable the computer system 600 to communicate with other networks or remote systems via a network, such as the network 104. Examples of the network devices 610 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Based on the foregoing, it should be appreciated that systems and methods for management of application access have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

I claim:

1. A method comprising:

obtaining, by a device that comprises a processor, an access control for an application program that is installed at the device, wherein the device is configured to deny access to application programs installed at the device when the device is locked, and wherein the access control specifies that an entity using the device is allowed to access the application program when the device is locked without the entity unlocking the device and without the device authenticating the entity; and presenting, by the device, a user interface that comprises a lock screen comprising a first user interface control that is selectable to present an application access screen and a second user interface control that is selectable to initiate unlocking of the device, wherein the device is configured to respond to an interaction with the first user interface control by the entity by presenting, by the device without unlocking the device and without authenticating the entity, the application access screen, wherein the application access screen comprises a third user interface control that corresponds to the application program, wherein selection of the third user interface control causes the device to allow access to the application program without the entity unlocking the device and without the device authenticating the entity.

2. The method of claim 1, wherein obtaining the access control comprises:

presenting a list of application programs installed at the device, the application programs comprising the application program;

presenting a user interface control that is selectable to assign the access control to the application program; and receiving input corresponding to the access control via the user interface control.

3. The method of claim 1 wherein obtaining the access control comprises:

presenting a list comprising data that indicates the application program that is installed at the device and a user interface control that assigns the access control to the application program that is installed at the device; and receiving input corresponding to the access control via the user interface control.

4. The method of claim 2, further comprising:

adding the third user interface control to the application access screen in response to setting the access control.

5. The method of claim 1, further comprising:

setting a further access control for a further application program, wherein the further access control specifies that access to the further application program is not allowed without unlocking the device; and storing a further setting that defines the further access control.

6. The method of claim 5, further comprising:

determining that the further setting is to be overridden based upon data collected at the device; and presenting, in the application access screen, a fourth user interface control that is selectable to cause the device to allow the access to the further application program without unlocking the device.

7. The method of claim 6, wherein the data collected comprises sensor data that indicates an emergency condition at the device.

8. A computer storage medium having computer-executable instructions stored thereon that, when executed by a processor, cause the processor to perform operations comprising:

obtaining an access control for an application program that is installed at a device, wherein the device is configured to deny access to application programs installed at the device when the device is locked, and wherein the access control specifies that an entity using the device is allowed to access the application program when the device is locked without the entity unlocking the device and without the device authenticating the entity; and presenting a user interface that comprises a lock screen comprising a first user interface control that is selectable to present an application access screen and a second user interface control that is selectable to initiate unlocking of the device, wherein the device is configured to respond to an interaction with the first user interface control by the entity by presenting, without authenticating the entity, the application access screen, wherein the application access screen comprises a third user interface control that corresponds to the application program, wherein selection of the third user interface control causes the device to allow access to the application program without the entity unlocking the device and without the device authenticating the entity.

9. The computer storage medium of claim 8, wherein the application program comprises a locally executed map application that accesses remotely provided data.

10. The computer storage medium of claim 8, wherein obtaining the access control comprises:

presenting a list of application programs installed at the device, the application programs comprising the application program;

presenting a user interface control that is selectable to assign the access control to the application program; and receiving input corresponding to the access control via the user interface control.

11. The computer storage medium of claim 10, wherein the computer-executable instructions, when executed by the processor, cause the processor to perform operations further comprising:

adding the third user interface control to the application access screen in response to setting the access control.

12. The computer storage medium of claim 8, wherein the computer-executable instructions, when executed by the processor, cause the processor to perform operations further comprising:

obtaining a further access control for a further application program, wherein the further access control specifies that access to the further application program is not allowed without unlocking the device; and storing a further setting that defines the further access control.

13. The computer storage medium of claim 12, wherein the computer-executable instructions, when executed by the processor, cause the processor to perform operations further comprising:

determining that the further setting is to be overridden based upon data collected at the device; and presenting, in the application access screen, a fourth user interface control that is selectable to cause the device to allow the access to the further application program without unlocking the device.

14. A device comprising:
a processor; and
a memory that stores computer-executable instructions that, when executed by the processor, cause the processor to perform operations comprising
obtaining an access control for an application program that is installed at the device, wherein the device is configured to deny access to application programs installed at the device when the device is locked, and wherein the access control specifies that an entity using the device is allowed to access the application program when the device is locked without the entity unlocking the device and without the device authenticating the entity; and
presenting a user interface that comprises a lock screen comprising a first user interface control that is selectable to present an application access screen and a second user interface control that is selectable to initiate unlocking of the device, wherein the device is configured to respond to an interaction with the first user interface control by the entity by presenting, without authenticating the entity and without unlocking the device, the application access screen, wherein the application access screen comprises a third user interface control that corresponds to the application program, wherein the third user interface control is selectable to cause the device to allow access to the application program without unlocking the device and without the device authenticating the entity.

15. The device of claim 14, wherein obtaining the access control comprises:
presenting a list of application programs installed at the device, the application programs comprising the application program;
presenting a user interface control that is selectable to assign the access control to the application program; and
receiving input corresponding to the access control via the user interface control.

16. The device of claim 15, wherein the computer-executable instructions, when executed by the processor, cause the processor to perform operations further comprising:
adding the third user interface control to the application access screen in response to setting the access control.

17. The device of claim 14, wherein the computer-executable instructions, when executed by the processor, cause the processor to perform operations further comprising:
setting a further access control for a further application program, wherein the further access control specifies that access to the further application program is not allowed without unlocking the device;
storing a further setting that defines the further access control;
determining that the further setting is to be overridden based upon data collected at the device; and
presenting, in the application access screen, a fourth user interface control that is selectable to cause the device to allow the access to the further application program without unlocking the device.

18. The method of claim 1, wherein the application program comprises a locally executed application that accesses remotely provided data.

19. The method of claim 1, wherein the application program comprises a map application.

20. The device of claim 14, wherein the application program comprises a locally executed map application that accesses remotely provided data.

* * * * *